Feb. 10, 1948.   M. G. GREENLAND   2,435,581
GYROSCOPIC INSTRUMENT
Filed March 14, 1944
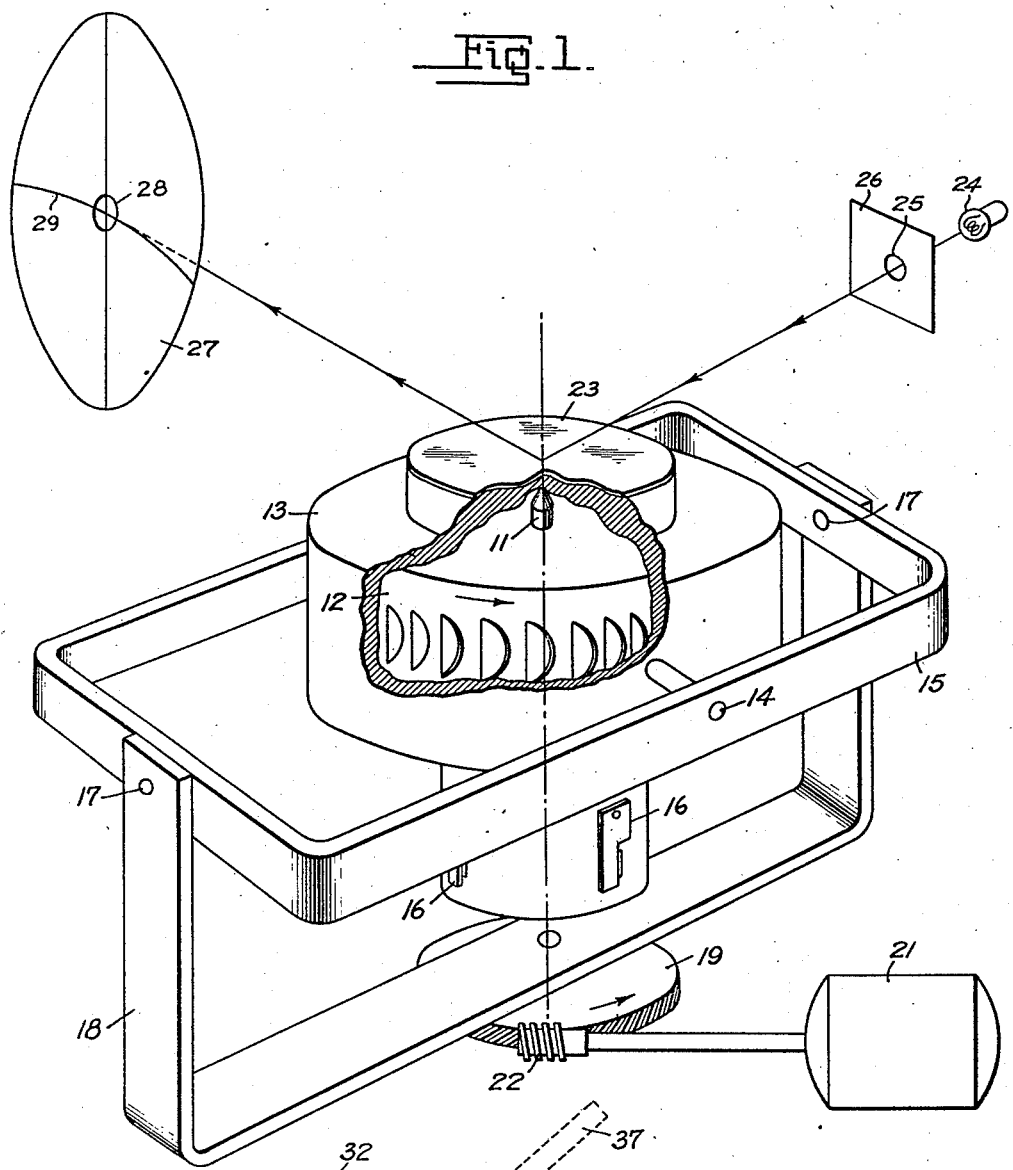
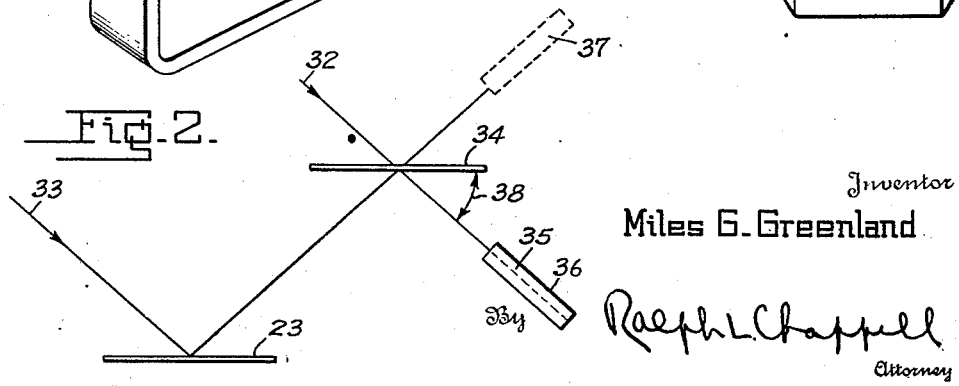
Inventor
Miles G. Greenland
By Ralph L. Chappell
Attorney Patented Feb. 10, 1948

2,435,581

UNITED STATES PATENT OFFICE 2,435,581

GYROSCOPIC INSTRUMENT

Miles G. Greenland, Philadelphia, Pa.

Application March 14, 1944, Serial No. 526,438

3 Claims. (Cl. 74—5)

(Granted under the act of March 3, 1883, as amended April 30, 1928; 370 O. G. 757)

This invention relates to improvements in gyroscopic instruments, particularly those used to establish a horizontal plane which may be used as an accurate reference, and this application is a continuation in part of my application Serial No. 459,618 which was filed on September 25, 1942, and is now abandoned.

Gyroscopic instruments have been commonly used in aircraft to establish a horizontal plane which is used in determining the attitude of the airplane with respect to the ground as in artificial horizon flight instruments; for use in navigation measurements as with gyro-sextants; and in automatic pilot mechanisms, etc.

Instruments designed to establish a horizontal plane are generally designated by the name of artificial horizon. Those artificial horizons that employ a gyroscope generally have the gyroscope rotating about a vertical axis and mounted in a gimbal system which permits the mounting to be tilted in any direction and the gyroscope to remain in its vertical position. The bearings of the gimbal system should be substantially frictionless so that movements of the gimbal system impose substantially no torque upon the gyroscope. For the same reason the spindle bearings of the gyroscope should also be as frictionless as possible.

Since any torque acting on a gyroscope so as to tend to change is axis of rotation will cause the gyroscope to precess, these gyroscopic instruments must be very carefully balanced as well as having their friction reduced to a minimum. An important item in the cost of manufacture of these instruments is the work involved in obtaining this correct balance and minimum friction.

In order to erect the gyroscope to a vertical position and to keep it there in spite of disturbing forces which would cause it to precess to a non-vertical position several types of erection systems have been developed. One type, wherein the gimbal system is rotated about the vertical axis, is illustrated by the patents to Gray et al., No. 1,308,783 and to Bassett, No. 1,942,470. A second type is exemplified by the patent to Carlson, No. 2,044,150 and by the patent to Hamilton, No. 2,300,548. In this second type the main characteristic is that a large component of the force which erects the gyroscope is applied at right angles to the displacement so that a large part of the precession resulting from the force will move the gyroscope directly from its displaced position to the vertical.

I have found that a much improved erection is obtained when the two types of erection systems are combined, and that when they are combined the gyroscope axis will remain in the vertical position even though the gimbal system is rotated about an axis which is not vertical. In the Gray and Bassett devices the gyroscope axis tends to align with the axis of rotation of the gimbals, and Bassett designed means to disconnect the gimbal drive means when the airplane is in a turn. This difficulty is not encountered with my device since as stated above the gyroscope axis remains vertical even though the gimbal system is rotated about a non-vertical axis. It has been found experimentally that with the axis of rotation of the gimbal system tilted to an angle of 20 degrees from the vertical the axis of the gyroscope will remain vertical. Even when the gyroscope was started about a non-vertical axis it precessed to a vertical axis position when the gimbals were being rotated about a non-vertical axis. The rate of rotation of the gimbals was approximately 60 revolutions per minute.

It has been further determined experimentally that my device will cause the proper erection of the gyroscope when the gimbal system is so unbalanced that neither the method of Gray and Bassett alone nor the method of Carlson and Hamilton alone would erect the gyroscope, in fact the axis of the gyroscope continued to depart further from the vertical when using either method singly.

The primary object of the invention is to provide a method and apparatus for reducing or eliminating errors in the indication of the true horizontal by a gyroscopic artificial horizon by rotating the gimbal rings about an axis which is substantially but not necessarily vertical while simultaneously applying an erecting torque to the gyroscope substantially at right angles to the displacement of the gyroscope axis from the vertical and in such direction as to cause it to precess back to the vertical.

Another object is to provide a method and apparatus for reducing or eliminating errors in the indication of the true horizontal, due to unbalance or friction in the gimbal ring system or gyro housing, of a gyroscopic artificial horizon having an erection system that applies an erecting torque substantially at right angles to the displacement of the gyroscope axis from the vertical and in such direction as to cause it to precess back to the vertical, which comprises providing means for rotating the gimbal ring system of the artificial horizon about a substantially vertical axis.

A further object of the invention is to provide means whereby the cost of manufacture of gyroscopic instruments which establish an artificial horizontal plane can be reduced.

Another object of the invention is the provision of means for reducing or eliminating errors in gyroscopic instruments used to establish an artificial horizontal plane, whether these errors are due to unbalance in the gimbal ring system or gyro housing, or due to friction. In instruments which have been reasonably well made and balanced, the invention will reduce the errors still remaining. However, by making use of the invention, the amount of care in manufacture and balancing the instrument can be reduced and yet the instrument will perform very satisfactorily.

Another object of the invention is to provide an improved gyroscopic artificial horizon or means for establishing a horizontal plane.

Another object of the invention is to provide a new and improved airplane gyroscopic flight instrument of the type which indicated the positions of the lateral and longitudinal axes of the airplane with respect to a horizontal plane.

Another object of the invention is to provide an improved gyro-sextant.

Other objects will become apparent as the description proceeds in connection with the drawings, in which:

Fig. 1 is a perspective view of an embodiment of the invention, as applied to an airplane gyroscopic flight instrument which indicates the positions of the lateral and longitudinal axes of the airplane with respect to a horizontal plane.

Fig. 2 is a schematic view of a gyro-sextant embodying the invention.

In Fig. 1, which for the purpose of illustration, shows an embodiment of the invention as applied to an airplane flight instrument for indicating the positions of the lateral and longitudinal axes of the airplane with reference to a horizontal plane, 11 designates the axis about which the gyro rotor 12 spins within the gyro housing 13, which is attached by gimbal bearings 14 to the gimbal ring 15. The rotor 12 is air driven and the gimbals and rotor are enclosed in an airtight casing (not shown) from which the air is drawn by a vacuum pump in the conventional manner, as exemplified by the device shown in the patent to Carlson, No. 2,044,150. In a similar manner, the rotor 12 and gyro housing 13 are erected to the vertical position by the air issuing from the vents in the bottom part of the side wall of the gyro housing, the air issuing from the vents being controlled by the pendulous vanes 16 which normally cover approximately one half of the area of each vent, but which move to cover either a larger or smaller portion of the area of the vent when the gyro housing 13 is displaced from the vertical, as is well understood by those skilled in the art, and as also illustrated by the Carlson Patent No. 2,044,150. In this type of erection system, when the gyro housing and gyro are displaced from the vertical, a torque is applied to the gyro housing substantially at right angles to the displacement of the gyro housing from the vertical, and in a direction to cause the gyroscope to precess directly back to the vertical position.

The gimbal ring 15 is mounted, as by outer gimbal bearings 17, between opposite end portions of a U-shaped supporting structure 18. Rigidly fastened to the U-shaped supporting structure 18 and in coaxial alignment with the gyro axis 11 when the latter is vertically disposed, is a worm gear 19 constantly driven in either direction, as by motor 21 and worm 22.

An indication of the true horizontal or true vertical may be obtained from the gyro in any one of several ways. The essential part of one system which may have several modifications is a suitable mirror mounted on the gyro housing or even on the axis of the gyro rotor itself. In Figure 1, a plane mirror 23 is shown mounted on the gyro housing. Fixed with respect to the airplane, ship, or other vehicle in which the gyro is installed is a light bulb 24, a lens 25 mounted in a mask 26, and a translucent screen 27 opposite the bulb and mask in which the image 28 of the light 24 is formed. Ordinarily, the bulb, mask and screen would be mounted in the case of the instrument.

In the operation of the improved gyroscopic artificial horizon, for example, in an airplane in flight, pitch of the plane could be indicated by movement of the spot of light 28 up and down on screen 27 and roll or bank would be indicated by movement of the spot across the screen. With the optical system as shown, the crosswise movement indicating bank would not be along a perfectly horizontal line, but along a slightly curved path as indicated at 29 in the figure. A combination of pitch and bank would be indicated by movement of the spot of light in a diagonal direction across the screen.

For use in a gyro sextant, an embodiment is shown in Figure 2 where the mirror 23 is fixed on the gyro housing or gyro axis with its reflecting plane perpendicular to the gyro axis. Light from the observed body passes along lines 32 and 33. The angle between the semi-transparent index mirror 34 and the axis of the telescope 35 may be measured in any suitable manner. The index mirror 34 is rotated about an axis normal to the longitudinal axis of the telescope tube 35 which is mounted external to the gyro system. The telescope may be placed at either 36 or 37. In either case, the index mirror 34 is located as shown. With the telescope located at 36, light from the observed body enters the telescope directly passing along path 32 and straight through the semi-transparent index mirror 34 into the telescope. Light from the body also passes along line 33, strikes the stabilized mirror 31 and is reflected to the index mirror 34 and again reflected into the telescope tube 35 and 36. When the mirror 34 is adjusted so that the images of the body due to light coming along paths 32 and 33 coincide the angle 38 between the axis of the telescope and the plane of the mirror 34 will measure the angular altitude of the body.

Another method of obtaining an indication of the true horizontal or vertical would be to use directly a part of the gyro housing as the indicator of the horizontal plane or vertical direction.

Various changes may be made in the form of invention shown and described without departing from the spirit of the invention or the scope of the following claims.

The invention described herein may be manufactured and used by or for the Government of the United States of America for governmental purposes without the payment of any royalties thereon or therefor.

I claim:

1. Means for reducing the error in an artificial horizon instrument which has a gyroscope freely mounted in gimbals and having a normally vertical axis, comprising means for continuously rotating the gimbal bearings at a substantially constant speed about the axis of the gyro rotor, and means responsive upon a displacement of said gyro rotor axis from its normally vertical position for exerting a force substantially at right angles to the displacement of said rotor axis and in such direction as to restore said rotor axis to its vertical position.

2. In an artificial horizon instrument of the character which includes a normally vertical gyroscope freely mounted in gimbals, the combination of means for continuously rotating the gimbal bearings about the normally vertical axis of the gyro rotor, and means responsive upon a displacement of said gyro rotor axis from its normally vertical position for exerting a force substantially at right angles to the displacement of said rotor axis and in such direction as to restore said rotor axis to its vertical position.

3. The combination with a gyroscope having a rotor and a gimbal supporting means therefor, of means for rotating said supporting means about the normal axis of spin of said rotor, and means responsive upon a displacement of said rotor axis from its normal position for exerting a force substantially at right angles to the displacement of said rotor axis and in such direction as to restore said axis to its normal position.

MILES G. GREENLAND.

REFERENCES CITED

The following references are of record in the file of this patent:

UNITED STATES PATENTS

| Number | Name | Date |
| --- | --- | --- |
| 1,308,783 | Gray | July 8, 1919 |
| 1,942,470 | Bassett | Jan. 9, 1934 |
| 1,429,588 | Hayford et al. | Sept. 19, 1922 |
| 2,273,876 | Lutz et al. | Feb. 24, 1942 |
| 2,300,548 | Hamilton | Nov. 3, 1942 |
| 2,044,150 | Carlson | June 16, 1936 |

FOREIGN PATENTS

| Number | Country | Date |
| --- | --- | --- |
| 316,380 | Great Britain | Aug. 1, 1929 |
| 4,891 | Great Britain | Feb. 25, 1914 |
| 760,535 | France | Aug. 11, 1933 |
| 509,648 | France | Aug. 23, 1920 |